US011869401B2

(12) United States Patent
Hong

(10) Patent No.: US 11,869,401 B2
(45) Date of Patent: Jan. 9, 2024

(54) DISPLAY DEVICE, IMAGE COMPENSATION METHOD THEREFOR, AND IMAGE COMPENSATION SYSTEM THEREFOR

(71) Applicant: Samsung Display Co., Ltd., Yongin-Si (KR)

(72) Inventor: Seokha Hong, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 29 days.

(21) Appl. No.: 17/667,745

(22) Filed: Feb. 9, 2022

(65) Prior Publication Data

US 2023/0071956 A1 Mar. 9, 2023

(30) Foreign Application Priority Data

Sep. 9, 2021 (KR) ........................ 10-2021-0120249

(51) Int. Cl.
*G09G 3/20* (2006.01)

(52) U.S. Cl.
CPC ....... *G09G 3/20* (2013.01); *G09G 2320/0233* (2013.01); *G09G 2360/16* (2013.01)

(58) Field of Classification Search
CPC ............. G09G 3/20; G09G 2320/0233; G09G 2360/16
See application file for complete search history.

(56) References Cited

U.S. PATENT DOCUMENTS 10,147,393 B2 * 12/2018 Yoon ........................ G09G 5/10
10,283,036 B2 * 5/2019 Yoo .......................... G09G 3/20
2009/0029740 A1 * 1/2009 Uchikawa ......... H04M 1/72448 345/207
2009/0304274 A1 * 12/2009 Yoshii ..................... G06T 5/009 348/739
2022/0059002 A1 * 2/2022 Park ......................... G09G 5/06

FOREIGN PATENT DOCUMENTS

KR 10-2015-0078029 A 7/2015
KR 10-2017-0101349 A 9/2017
KR 10-2019-0116599 A 10/2019

* cited by examiner

*Primary Examiner* — Gene W Lee
(74) *Attorney, Agent, or Firm* — Innovation Counsel LLP

(57) ABSTRACT

A display device may include a display panel including a plurality of pixels, a data compensator configured to calculate compensation grayscale data for a measuring grayscale based on capturing luminance data including luminances of the pixels corresponding to one of capturing grayscales included in a plurality of grayscales, measuring luminance data including luminances of a plurality of areas of the display panel corresponding to the measuring grayscale other than the capturing grayscales among the grayscales, and input grayscale data for the measuring grayscale, a timing controller configured to generate output grayscale data based on the input grayscale data and the compensation grayscale data, and a data driver configured to generate a data voltage based on the output grayscale data, and provide the data voltage to the display panel.

17 Claims, 10 Drawing Sheets

DISPLAY DEVICE, IMAGE COMPENSATION METHOD THEREFOR, AND IMAGE COMPENSATION SYSTEM THEREFOR

CROSS-REFERENCE TO RELATED APPLICATION

This application claims priority under 35 USC § 119 to Korean Patent Application No. 10-2021-0120249 filed on Sep. 9, 2021, in the Korean Intellectual Property Office (KIPO), the entire disclosure of which is incorporated herein by reference.

BACKGROUND

1. Field

Embodiments relate to a display device. More particularly, embodiments relate to a display device applied to various electronic apparatuses, an image compensation method for the display device, and an image compensation system for the display device.

2. Description of the Related Art

A display device may include a plurality of pixels. Ideally, the pixels may emit lights having the same luminance in response to the same data voltage.

However, a characteristic deviation among the pixels may occur during a manufacturing process and/or a use process of the display device. When the characteristic deviation among the pixels occurs, the pixels may emit lights having mutually different luminances in response to the same data voltage. Accordingly, the display device may display an image having a non-uniform luminance, and a spot may be visually recognized from the image.

SUMMARY

Embodiments provide a display device that displays an image having uniform luminance Embodiments provide an image compensation method and an image compensation system for the display device for displaying an image having uniform luminance.

A display device according to one embodiment may include a display panel including a plurality of pixels; a data compensator configured to calculate compensation grayscale data for a measured grayscale based on captured luminance data including luminances of the pixels corresponding to one of captured grayscales included in a plurality of grayscales, measured luminance data including luminances of a plurality of areas of the display panel corresponding to the measured grayscale other than the captured grayscales among the grayscales, and input grayscale data for the measured grayscale; a timing controller configured to generate output grayscale data based on the input grayscale data and the compensation grayscale data; and a data driver configured to generate a data voltage based on the output grayscale data and provide the data voltage to the display panel.

In one embodiment, the measured grayscale may be smaller than a minimum captured grayscale.

In one embodiment, the data compensator may include a captured gamma calculator configured to calculate captured gamma data based on the captured luminance data; a captured luminance ratio calculator configured to calculate captured luminance ratio data corresponding to a ratio of the captured luminance data to a captured target luminance based on the captured luminance data; a measured gamma calculator configured to calculate measured gamma data based on the measured luminance data; a measured luminance ratio calculator configured to calculate measured luminance ratio data corresponding to a ratio of the measured luminance data to a measured target luminance based on the measured luminance data; and a compensation grayscale calculator configured to calculate the compensation grayscale data for the measured grayscale based on the input grayscale data for the measured grayscale, the captured gamma data, the captured luminance ratio data, the measured gamma data, and the measured luminance ratio data.

In one embodiment, the captured target luminance may include an average luminance of pixels located at a center portion of the display panel among the pixels.

In one embodiment, the measured gamma calculator may be configured to calculate the measured gamma data based on the measured luminance data and luminance data corresponding to a maximum grayscale among the grayscales.

In one embodiment, the measured gamma calculator may be configured to calculate the measured gamma data based on the measured luminance data and luminance data corresponding to a grayscale that is adjacent to the measured grayscale among the grayscales.

In one embodiment, the measured gamma calculator may be configured to smooth the measured gamma data by using a median filter.

In one embodiment, the measured target luminance may include a luminance of an area located at a center portion of the display panel among the areas.

In one embodiment, the compensation grayscale calculator may be configured to calculate the compensation grayscale data for the measured grayscale by Mathematical formulas 1, 2 and 3 below:

$$LRM=\alpha*LRC \quad \text{Mathematical formula 1}$$

$$\gamma M=\beta*\gamma C \quad \text{Mathematical formula 2}$$

$$GC=GI/((LRC*\alpha)1/(\gamma C*\beta))-GI \quad \text{Mathematical formula 3}$$

where LRM is a measured luminance ratio included in measured luminance ratio data, LRC is a captured luminance ratio included in captured luminance ratio data, γM is a measured gamma included in measured gamma data, γC is a captured gamma included in captured gamma data, GC is a compensation grayscale value included in compensation grayscale data, and GI is an input grayscale value included in input grayscale data.

In one embodiment, the data compensator may be configured to calculate compensation grayscale data for the captured grayscale based on the captured luminance data and input grayscale data for the captured grayscale.

In one embodiment, the data compensator may be configured to calculate compensation grayscale data for a predicted grayscale other than the captured grayscales and the measured grayscale among the grayscales based on interpolation or extrapolation of the compensation grayscale data for the captured grayscale.

An image compensation method for a display device according to an embodiment may include generating captured luminance data including luminances of a plurality of pixels of a display panel corresponding to one of captured grayscales included in a plurality of grayscales; generating measured luminance data including luminances of a plurality of areas of the display panel corresponding to a measured grayscale other than the captured grayscales among the grayscales; calculating compensation grayscale data for the measured grayscale based on the captured luminance data, the measured luminance data, and input grayscale data for the measured grayscale; generating output grayscale data based on the input grayscale data and the compensation grayscale data; and providing a data voltage generated based on the output grayscale data to the display panel.

In one embodiment, the measured grayscale may be smaller than a minimum the captured grayscale.

In one embodiment, the calculating of the compensation grayscale data for the measured grayscale may include calculating captured gamma data based on the captured luminance data; calculating captured luminance ratio data corresponding to a ratio of the captured luminance data to a captured target luminance based on the captured luminance data; calculating measured gamma data based on the measured luminance data; calculating measured luminance ratio data corresponding to a ratio of the measured luminance data to a measured target luminance based on the measured luminance data; and calculating the compensation grayscale data for the measured grayscale based on the input grayscale data for the measured grayscale, the captured gamma data, the captured luminance ratio data, the measured gamma data, and the measured luminance ratio data.

In one embodiment, the calculating of the measured gamma data may include calculating the measured gamma data based on the measured luminance data and luminance data corresponding to a maximum grayscale among the grayscales.

In one embodiment, the calculating of the measured gamma data may include calculating the measured gamma data based on the measured luminance data and luminance data corresponding to a grayscale that is adjacent to the measured grayscale among the grayscales.

In one embodiment, the calculating of the measured gamma data may include smoothing the measured gamma data by using a median filter.

An image compensation system for a display device which includes a display panel having a plurality of pixels according to an embodiment may include a display panel including a plurality of pixels; an image capturing device configured to capture an image of the display panel to generate captured luminance data including luminances of the pixels corresponding to one of captured grayscales included in a plurality of grayscales; a luminance measuring device configured to measure luminances of a plurality of areas of the display panel to generate measured luminance data including luminances of the areas corresponding to a measured grayscale other than the captured grayscales among the grayscales; a data compensator configured to calculate compensation grayscale data for the measured grayscale based on the captured luminance data, the measured luminance data, and input grayscale data for the measured grayscale; a timing controller configured to generate output grayscale data based on the input grayscale data and the compensation grayscale data; and a data driver configured to generate a data voltage based on the output grayscale data, and provide the data voltage to the display panel.

In one embodiment, each of the areas of the display panel may include at least one pixel.

In one embodiment, the measured grayscale may be smaller than a minimum captured grayscale.

The display device according to the embodiments may include the data compensator configured to calculate the compensation grayscale data for the measured grayscale based on the captured luminance data and the measured luminance data, so that the input grayscale data for the measured grayscale may be accurately compensated, and the display device may display an image having uniform luminance.

In the image compensation method and the image compensation system for the display device according to the embodiments, the compensation grayscale data for the measured grayscale may be calculated based on the captured luminance data and the measured luminance data, so that the input grayscale data for the measured grayscale may be accurately compensated, and the display device may display an image having uniform luminance.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display devices, image compensation methods for the display devices, and image compensation systems for the display devices in accordance with embodiments will be explained in detail with reference to the accompanying drawings.

Figure 1:
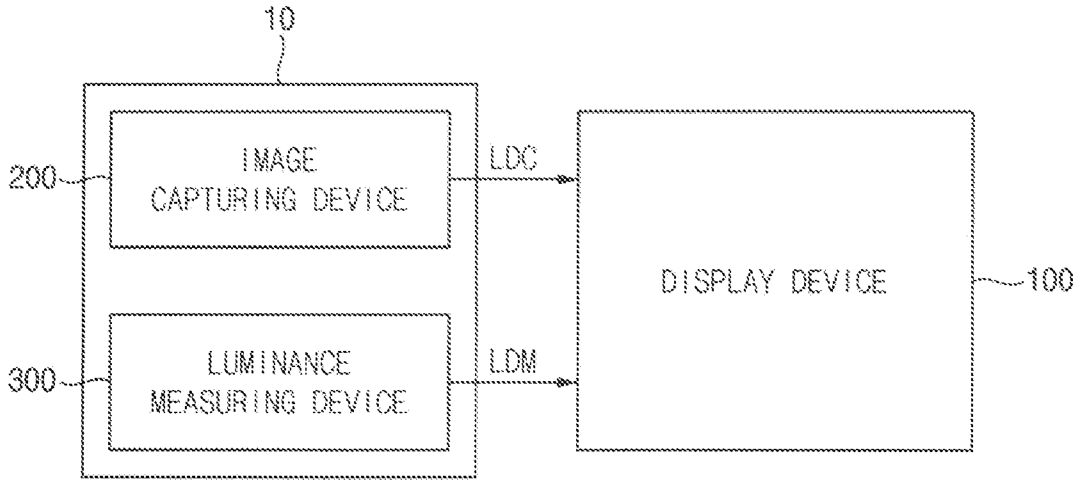
FIG. 1 is a block diagram showing an image compensation system according to one embodiment of the present disclosure.

FIG. 1 is a block diagram showing an image compensation system 10 according to one embodiment of the present disclosure.

Referring to FIG. 1, an image compensation system 10 may include an image capturing device 200 and a luminance measuring device 300 for a display device 100.

The display device 100 may include a display panel including a plurality of pixels. Each of the pixels may emit a light and the display device 100 may display an image through the lights emitted from the pixels.

The image capturing device 200 may capture an image displayed on the display device 100. The image capturing device 200 may capture an image having a luminance corresponding to at least one captured grayscale among a plurality of grayscales. According to one embodiment, the plurality of grayscales may include 0 to 255 grayscales.

The image capturing device 200 may generate captured luminance data LDC including luminances of the pixels of the display device 100 corresponding to the captured grayscale. For example, when the captured grayscale is a 16 grayscale, the captured luminance data LDC may include luminances of the pixels corresponding to the 16 grayscale. The image capturing device 200 may provide the captured luminance data LDC to the display device 100 to a data compensator 150.

The luminance measuring device 300 may measure a luminance of an image displayed on the display panel 110. The luminance measuring device 300 may measure luminances of areas of the display panel corresponding to at least one measured grayscale other than the captured grayscale among the grayscales. According to one embodiment, each of the areas of the display panel may include at least one pixel.

The luminance measuring device 300 may generate measured luminance data LDM including the luminances of the areas of the display panel corresponding to the measured grayscale. For example, when the measured grayscale is a 10 grayscale, the measured luminance data LDM may include the luminances of the areas of the display panel corresponding to the 10 grayscale. The luminance measuring device 300 may provide the measured luminance data LDM to the display device 100 to the data compensator 150.

Figure 2:
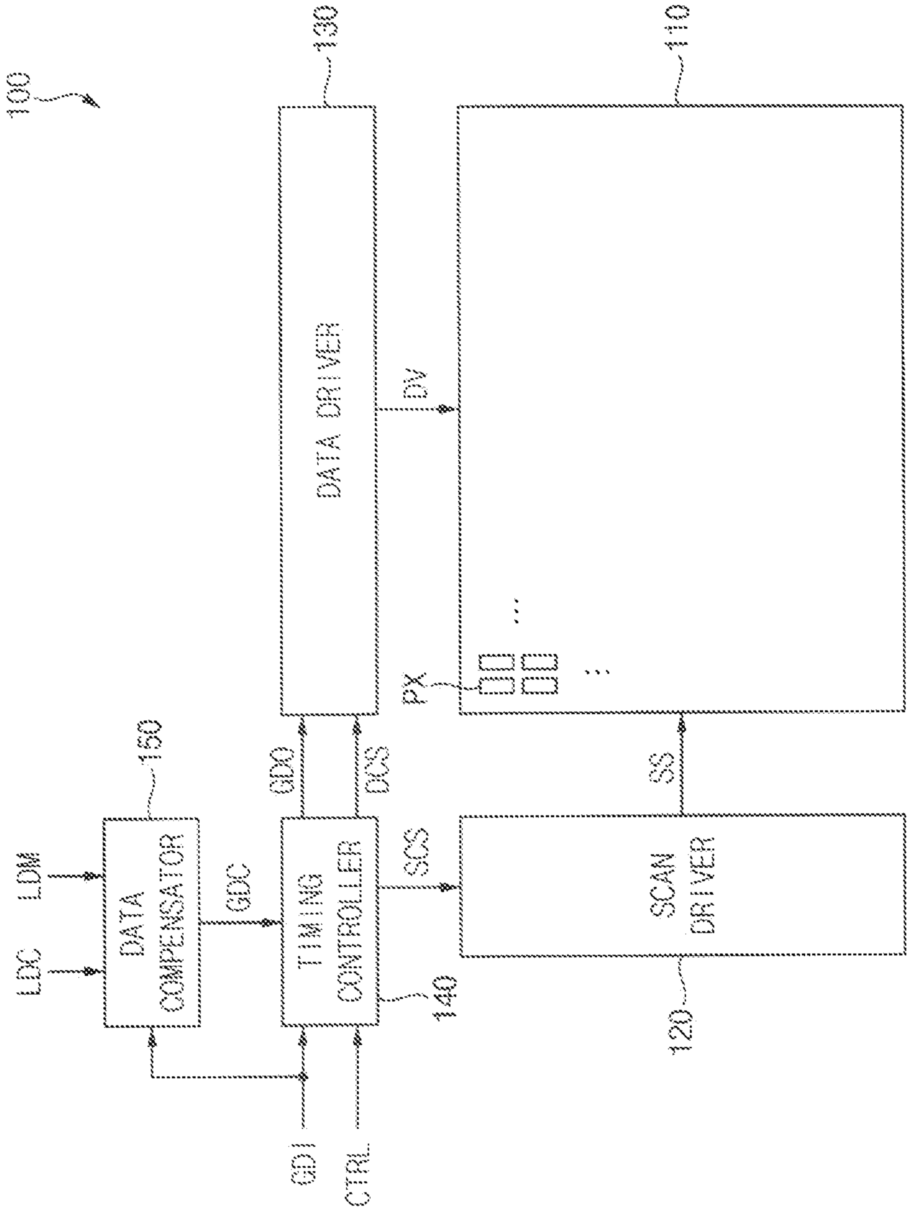
FIG. 2 is a block diagram showing a display device according to one embodiment of the present disclosure.

FIG. 2 is a block diagram showing a display device 100 according to one embodiment of the present disclosure.

Referring to FIGS. 1 and 2, the display device 100 may include a display panel 110, a scan driver 120, a data driver 130, a timing controller 140, and a data compensator 150.

The display panel 110 may include a plurality of pixels PX. Each of the pixels PX may emit light having a luminance.

The scan driver 120 may generate a scan signal SS in response to a scan control signal SCS provided from the timing controller 140. The scan driver 120 may provide the scan signal SS to the display panel 110.

The data driver 130 may generate a data voltage DV based on output grayscale data GDO and a data control signal DCS provided from the timing controller 140. The data driver 130 may provide the data voltage DV to the display panel 110.

The timing controller 140 may generate the output grayscale data GDO, the scan control signal SCS, and the data control signal DCS based on input grayscale data GDI and a control signal CTRL which are provided from an external device, and compensation grayscale data GDC provided from the data compensator 150. According to one embodiment, the timing controller 140 may generate the output grayscale data GDO by adding the compensation grayscale data GDC to the input grayscale data GDI. The timing controller 140 may provide the scan control signal SCS to the scan driver 120 and may provide the output grayscale data GDO and the data control signal DCS to the data driver 130.

The data compensator 150 may generate the compensation grayscale data GDC based on the captured luminance data LDC provided from the image capturing device 200, the measured luminance data LDM provided from the luminance measuring device 300, and the input grayscale data GDI provided from the external device. The data compensator 150 may provide the compensation grayscale data GDC to the timing controller 140.

Figure 3:
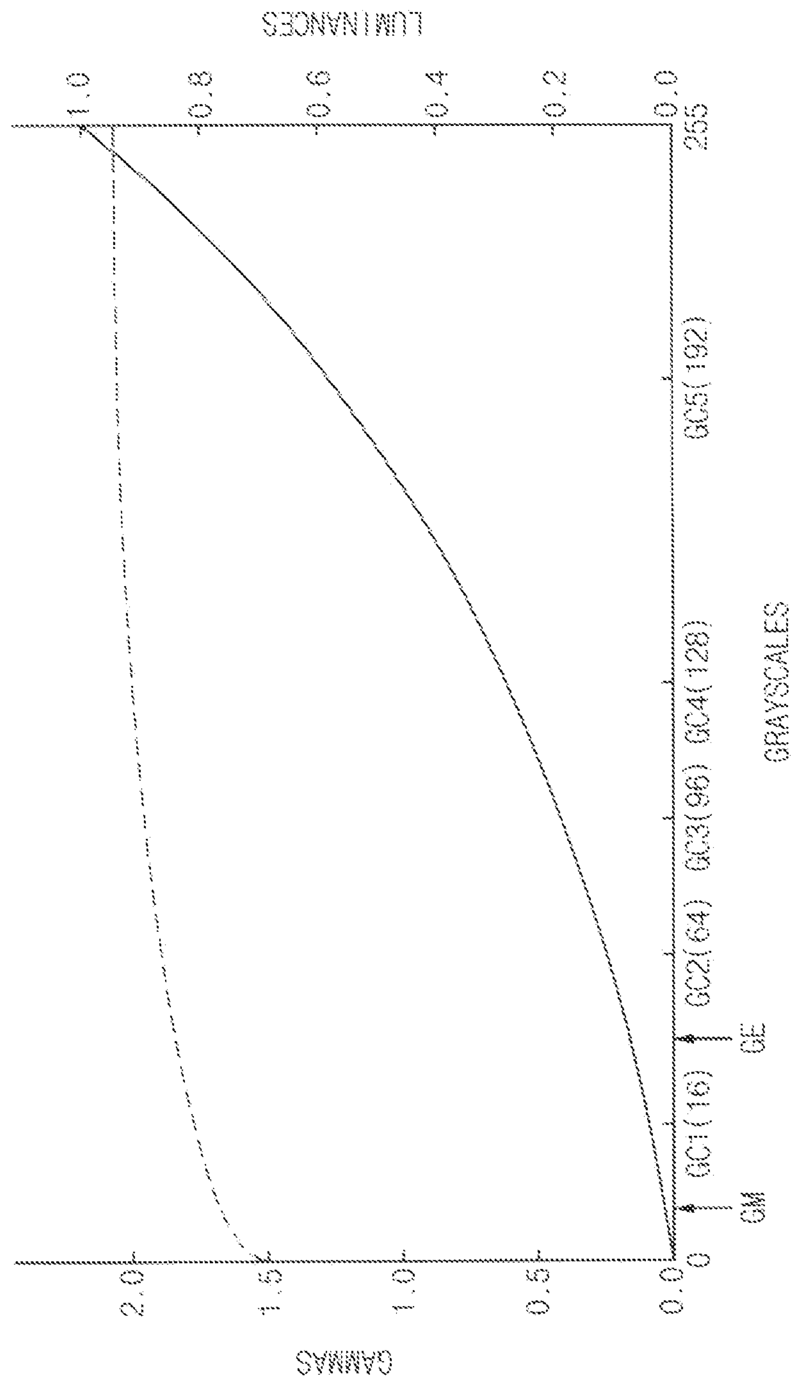
FIG. 3 is a graph showing luminances and gammas corresponding to all grayscales.

FIG. 3 is a graph showing luminances and gammas corresponding to all grayscales. For example, FIG. 3 may represent luminances and gammas of one pixel corresponding to all grayscales.

Referring to FIGS. 1, 2, and 3, the pixel PX may emit light having luminances corresponding to a plurality of grayscales. According to one embodiment, the grayscales may include 0 to 255 grayscales. The grayscales may include captured grayscales GC1 to GC5, measured grayscales GM, and predicted grayscales GE.

The image capturing device 200 may capture an image having a luminance corresponding to the captured grayscales GC1 to GC5. According to one embodiment, the captured grayscales GC1 to GC5 may include a first captured grayscale GC1, a second captured grayscale GC2, a third captured grayscale GC3, a fourth captured grayscale GC4, and a fifth captured grayscale GC5. For example, the first captured grayscale GC1, the second captured grayscale GC2, the third captured grayscale GC3, the fourth captured grayscale GC4, and the fifth captured grayscale GC5 may be a 16 grayscale, a 64 grayscale, a 96 grayscale, a 128 grayscale, and a 192 grayscale, respectively.

The luminance measuring device 300 may measure a luminance of an image corresponding to the measured grayscale GM. According to one embodiment, each of the measured grayscales GM may be smaller than a minimum captured grayscale among the captured grayscales GC1 to GC5. For example, each of the measured grayscales GM may be smaller than the first captured grayscale GC1, which is the 16 grayscale.

The predicted grayscales GE may be grayscales other than the captured grayscales GC1 to GC5 and the measured grayscales GM among the grayscales. For example, the predicted grayscales GE may be 17 to 63 grayscales, 65 to 95 grayscales, 97 to 127 grayscales, 129 to 191 grayscales, and 193 to 255 grayscales.

Figure 4:
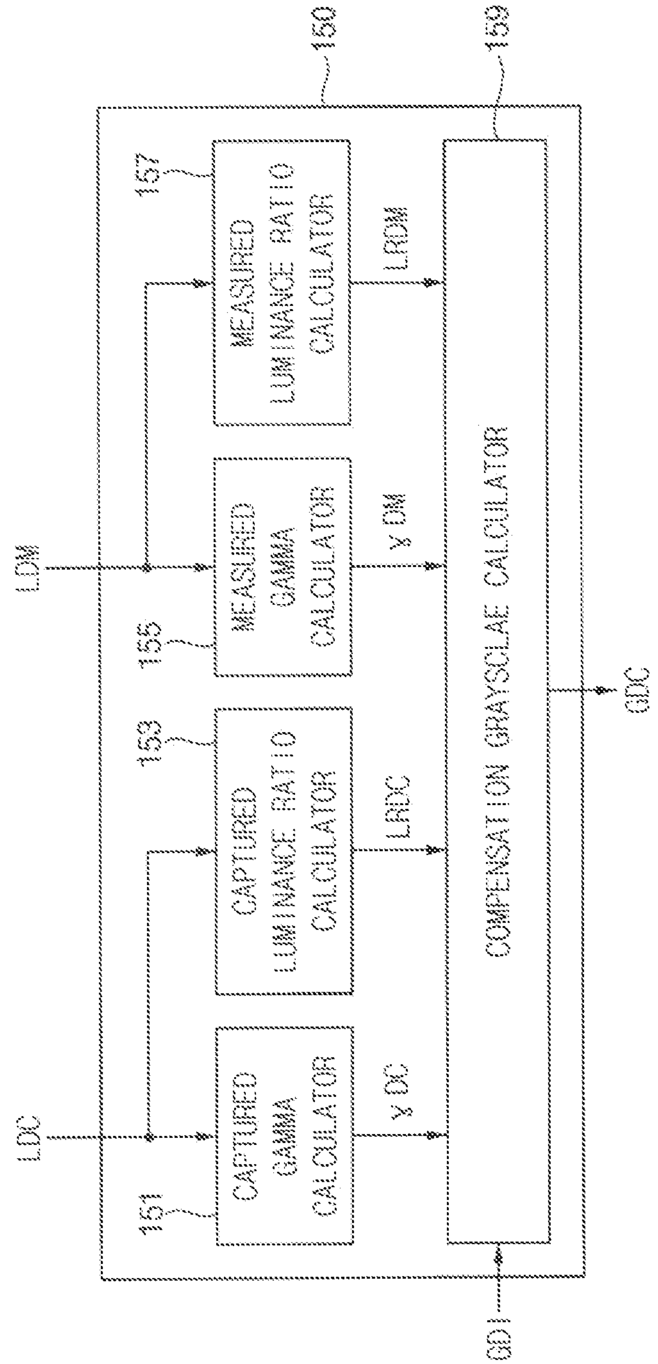
FIG. 4 is a block diagram showing a data compensator included in the display device of FIG. 2.

FIG. 4 is a block diagram showing a data compensator 150 included in the display device 100 of FIG. 2.

Referring to FIGS. 2, 3, and 4, the data compensator 150 may include a captured gamma calculator 151, a captured luminance ratio calculator 153, a measured gamma calculator 155, a measured luminance ratio calculator 157, and a compensation grayscale calculator 159.

The captured gamma calculator 151 may calculate captured gamma data γDC based on the captured luminance data LDC. The captured luminance data LDC may include captured luminances of the pixels PX corresponding to the captured grayscale. The captured gamma data γDC may include captured gammas of the pixels PX corresponding to the captured grayscale. One captured gamma may be calculated from at least two captured luminances.

The captured luminance ratio calculator 153 may calculate captured luminance ratio data LRDC based on the captured luminance data LDC. The captured luminance ratio data LRDC may correspond to a ratio of the captured luminance data LDC to a captured target luminance. The captured luminance ratio data LRDC may include ratios of the captured luminances to the captured target luminance.

Figure 5:
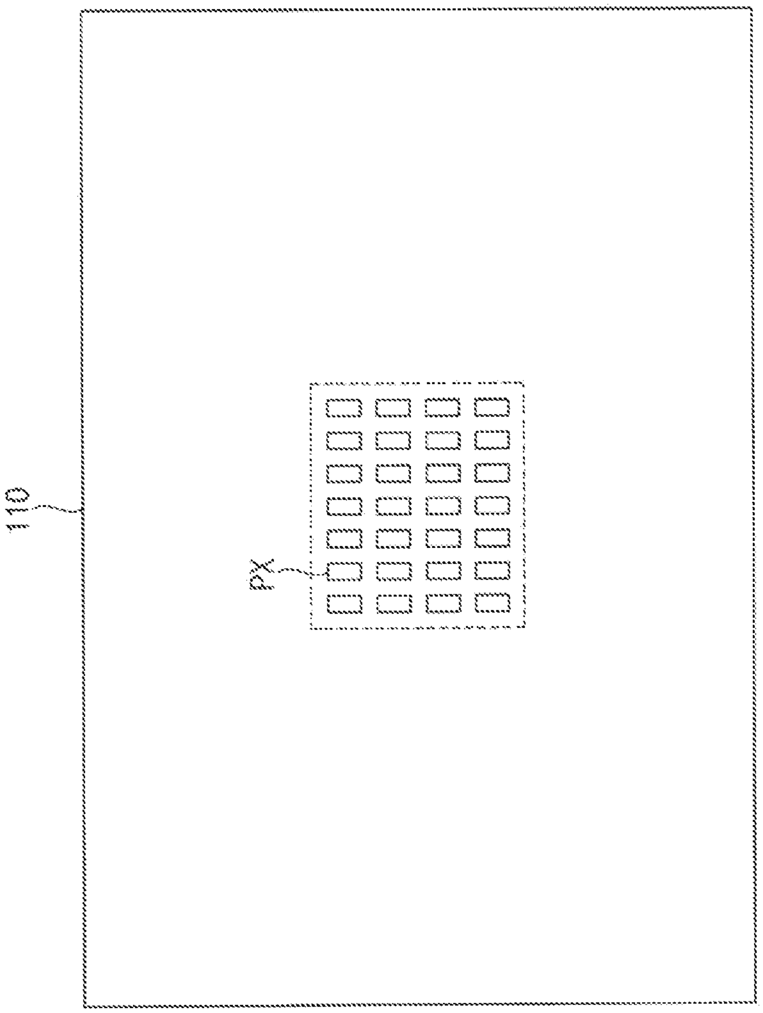
FIG. 5 is a plan view showing pixels of a display panel included in the display device of FIG. 2.

FIG. 5 is a plan view showing pixels PX of a display panel 110 included in the display device 100 of FIG. 2.

Referring to FIG. 5, according to one embodiment, the captured target luminance may be an average luminance of pixels PX located at a center portion of the display panel 110. In other words, the captured target luminance may be an average of the captured luminances of the pixels PX located at the center portion of the display panel 110.

Figure 6:
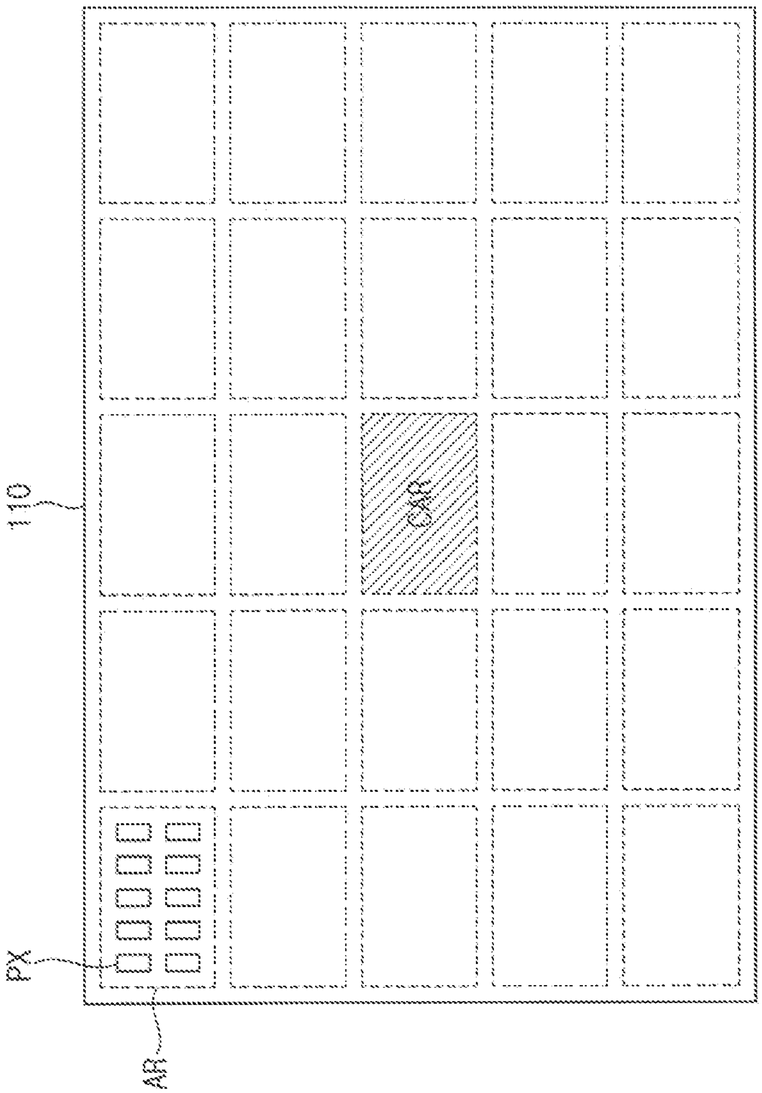
FIG. 6 is a plan view showing areas of the display panel included in the display device of FIG. 2.

FIG. 6 is a plan view showing areas AR of the display panel 110 included in the display device 100 of FIG. 2.

Referring to FIGS. 2, 3, 4, and 6, the measured gamma calculator 155 may calculate measured gamma data γDM based on the measured luminance data LDM. The measured luminance data LDM may include measured luminances of areas AR of the display panel 110 corresponding to the measured grayscale. Each of the areas AR of the display panel 110 may include at least one pixel PX. The measured gamma data γDM may include measured gammas of the areas AR of the display panel 110 corresponding to the measured grayscale. One measured gamma may be calculated from at least two measured luminances.

According to one embodiment, the measured gamma calculator 155 may calculate the measured gamma data γDM corresponding to the measured grayscale based on the measured luminance data LDM corresponding to the measured grayscale and luminance data corresponding to a maximum grayscale among the grayscales. For example, the maximum grayscale may be a 255 grayscale. The measured gamma corresponding to the measured grayscale may be calculated by Mathematical formula 1 below.

$$Lm/L\max=(Gm/G\max)^{\gamma M} \quad \text{Mathematical formula 1}$$

In this case, Lm is a measured luminance corresponding to a measured grayscale, Lmax is a luminance corresponding to a maximum grayscale, Gm is an input grayscale value for a measured grayscale, Gmax is an input grayscale value for a maximum grayscale, and γM is a measured gamma corresponding to a measured grayscale.

According to another embodiment, the measured gamma calculator 155 may calculate the measured gamma data γDM corresponding to the measured grayscale based on the measured luminance data LDM corresponding to the measured grayscale and luminance data corresponding to an adjacent grayscale that is adjacent to the measured grayscale. For example, when the measured grayscale is a 10 grayscale, the adjacent grayscale may be an 11 grayscale. The measured gamma corresponding to the measured grayscale may be calculated by Mathematical formula 2 below.

$$Lm/\text{Ladj}=(Gm/\text{Gadj})^{\gamma M} \quad \text{Mathematical formula 2}$$

In this case, Lm is a measured luminance corresponding to a measured grayscale, Ladj is a luminance corresponding to an adjacent grayscale, Gm is an input grayscale value for a measured grayscale, Gadj is an input grayscale value for an adjacent grayscale, and γM is a measured gamma corresponding to a measured grayscale.

The measured gamma calculator 155 may smooth the measured gamma data γDM. According to one embodiment, the measured gamma calculator 155 may smooth the measured gamma data γDM by using a median filter.

The measured luminance ratio calculator 157 may calculate measured luminance ratio data LRDM based on the measured luminance data LDM. The measured luminance ratio data LRDM may correspond to a ratio of the measured luminance data LDM to a measured target luminance. The measured luminance ratio data LRDM may include ratios of the measured luminances to the measured target luminance.

According to one embodiment, the measured target luminance may be a luminance of an area CAR located at the center portion of the display panel 110. For example, when the display panel 110 includes areas AR arranged in five rows and five columns as disclosed in FIG. 6, the measured target luminance may be the luminance of the area CAR located in a third row and a third column of the display panel 110.

The compensation grayscale calculator 159 may calculate the compensation grayscale data GDC based on the input grayscale data GDI, the captured gamma data yDC, the captured luminance ratio data LRDC, the measured gamma data γDM, and the measured luminance ratio data LRDM.

The data compensator 150 may calculate compensation grayscale data GDC which include a compensation grayscale value GC for the captured grayscale based on the captured luminance data LDC and input grayscale data GDI for the captured grayscale. In detail, the compensation grayscale compensator 159 may calculate the compensation grayscale data GDC which include a compensation grayscale value GC for the captured grayscale based on the input grayscale data GDI for the captured grayscale, the captured gamma data yDC, and the captured luminance ratio data LRDC. According to one embodiment, the compensation grayscale data GDC which include a compensation grayscale value GC for the captured grayscale may be calculated by Mathematical formula 3 below.

$$GC=GI/(LRC^{1/\gamma c})-GI \quad \text{Mathematical formula 3}$$

In this case, GC is a compensation grayscale value included in compensation grayscale data GDC for a captured grayscale, GI is an input grayscale value included in input grayscale data GDI for the captured grayscale, LRC is a captured luminance ratio included in captured luminance ratio data LRDC, and γC is a captured gamma included in captured gamma data yDC.

The data compensator 150 may calculate compensation grayscale data GDC which include a compensation grayscale value GC for the measured grayscale based on the captured luminance data LDC, the measured luminance data LDM, and input grayscale data GDI for the measured grayscale. The compensation grayscale calculator 159 may calculate the compensation grayscale data GDC which include a compensation grayscale value GC for the measured grayscale based on the input grayscale data GDI for the measured grayscale, the captured gamma data yDC, the captured luminance ratio data LRDC, the measured gamma data γDM, and the measured luminance ratio data LRDM. According to one embodiment, the compensation grayscale data GDC which include a compensation grayscale value for the measured grayscale may be calculated by Mathematical formulas 4 to 6 below.

$$LRM=\alpha * LRC \quad \text{Mathematical formula 4}$$

$$\gamma M=\beta * \gamma C \quad \text{Mathematical formula 5}$$

$$GC=GI/(LRC*\alpha)^{1/(\gamma c*\beta)}-GI \quad \text{Mathematical formula 6}$$

In this case, LRM is a measured luminance ratio included in measured luminance ratio data LRDM, LRC is a captured luminance ratio included in captured luminance ratio data LRDC, γM is a measured gamma included in measured gamma data, γC is a captured gamma included in captured gamma data, GC is a compensation grayscale value included in compensation grayscale data, and GI is an input grayscale value included in input grayscale data.

The data compensator 150 may calculate compensation grayscale data GDC for the predicted grayscale GE based on interpolation or extrapolation of the compensation grayscale data GDC for the captured grayscale. According to one embodiment, the compensation grayscale data GDC for the predicted grayscale GE between the captured grayscales may be calculated by the interpolation of the compensation grayscale data GDC, and the compensation grayscale data GDC for the predicted grayscale GE that is greater than a maximum captured grayscale among the captured grayscales may be calculated by the extrapolation of the compensation grayscale data GDC. According to one embodiment, the compensation grayscale data GDC for the predicted grayscale GE may be calculated by linear interpolation or extrapolation, polynomial interpolation or extrapolation, or the like of the compensation grayscale data GDC for the captured grayscale.

Figure 7:
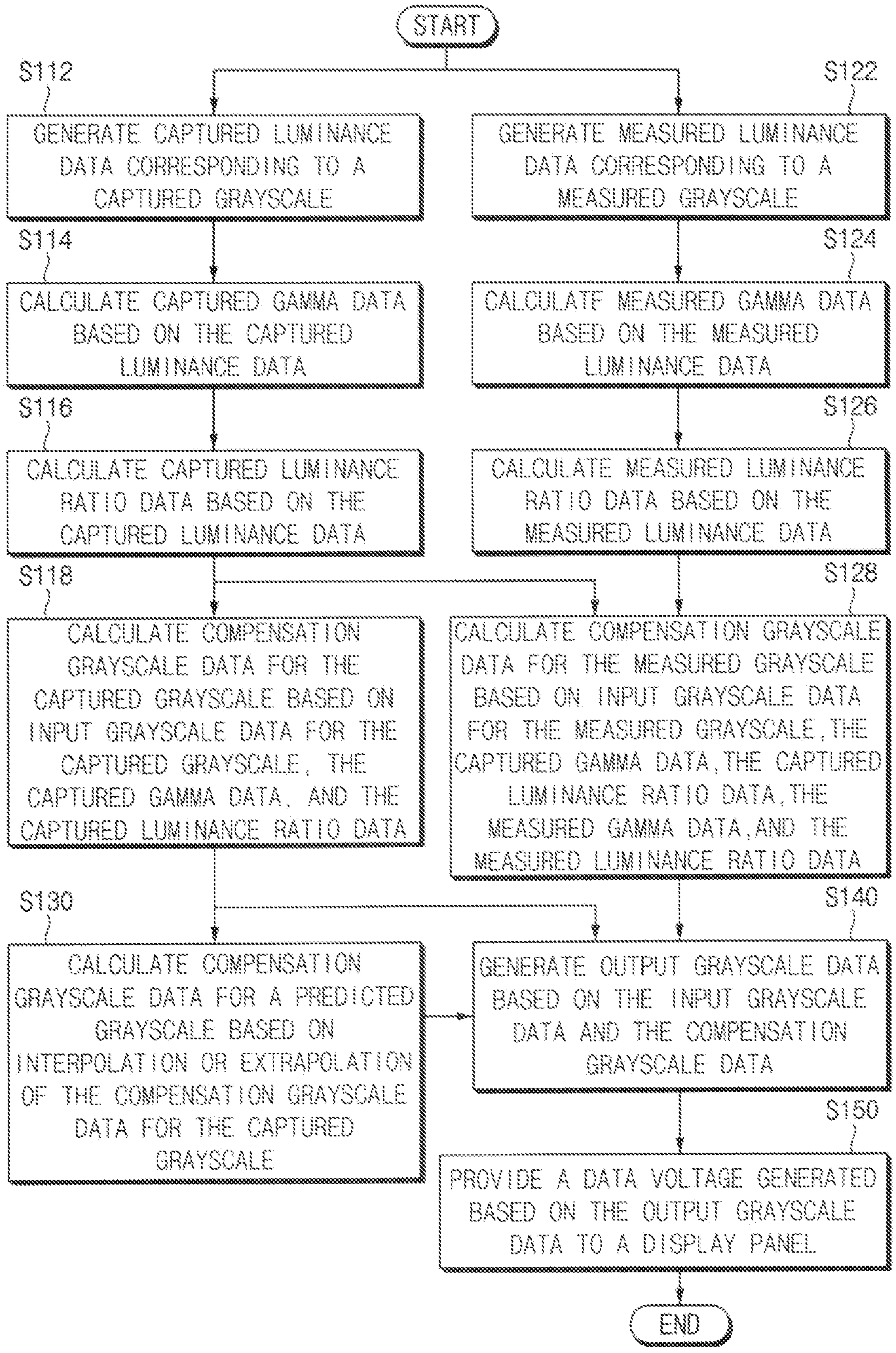
FIG. 7 is a flowchart showing an image compensation method for a display device according to one embodiment of the present disclosure.

FIG. 7 is a flowchart showing an image compensation method for a display device 100 according to one embodiment of the present disclosure.

Referring to FIGS. 1, 2, 4, and 7, an image capturing device 200 may generate captured luminance data LDC corresponding to a captured grayscale (S112). The captured luminance data LDC may include captured luminances of pixels PX of a display panel 110 corresponding to the captured grayscale.

A captured gamma calculator 151 of a data compensator 150 may calculate captured gamma data yDC based on the captured luminance data LDC (S114). The captured gamma data yDC may include captured gammas of the pixels PX corresponding to the captured grayscale.

A captured luminance ratio calculator 153 of the data compensator 150 may calculate captured luminance ratio data LRDC based on the captured luminance data LDC (S116). The captured luminance ratio data LRDC may correspond to a ratio of the captured luminance data LDC to a captured target luminance. The captured luminance ratio data LRDC may include ratios of the captured luminances to the captured target luminance.

A compensation grayscale calculator 159 of the data compensator 150 may calculate compensation grayscale data GDC for the captured grayscale based on input grayscale data GDI for the captured grayscale, the captured gamma data yDC, and the captured luminance ratio data LRDC (S118). According to one embodiment, the compensation grayscale data GDC for the captured grayscale may be calculated by Mathematical formula 3 described above.

A luminance measuring device 300 may generate measured luminance data LDM corresponding to a measured grayscale (S122). The measured luminance data LDM may include measured luminances of areas AR of the display panel 110 corresponding to the measured grayscale.

A measured gamma calculator 155 of the data compensator 150 may calculate measured gamma data γDM based on the measured luminance data LDM (S124). The measured gamma data γDM may include measured gammas of the areas AR corresponding to the measured grayscale.

Figure 8:
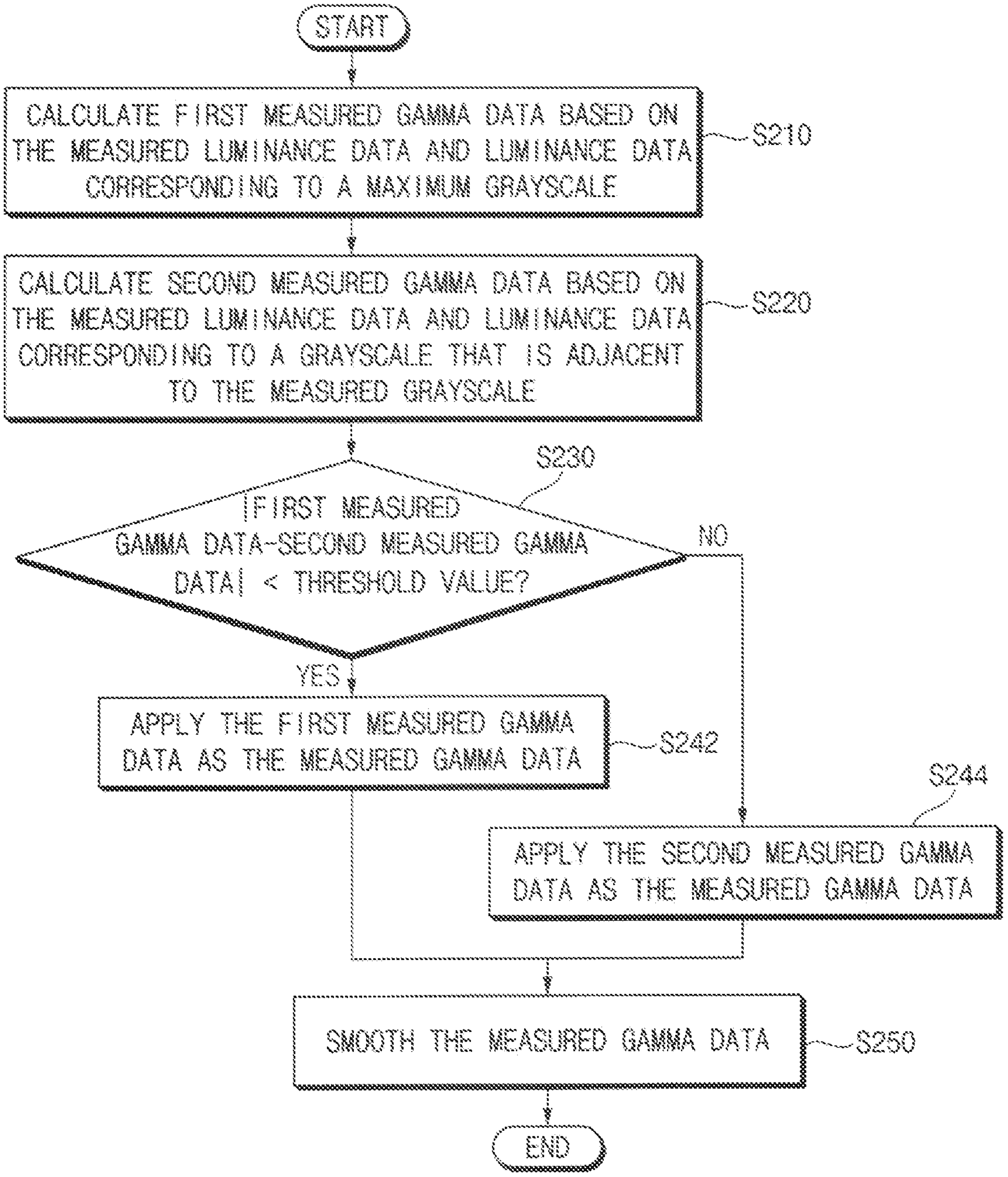
FIG. 8 is a flowchart showing a step of calculating measured gamma data included in the image compensation method of FIG. 7.

FIG. 8 is a flowchart showing a step S124 of calculating measured gamma data included in the image compensation method of FIG. 7.

Referring to FIGS. 4 and 8, the measured gamma calculator 155 may calculate first measured gamma data corresponding to the measured grayscale based on the measured luminance data LDM corresponding to the measured grayscale and luminance data corresponding to a maximum grayscale among a plurality of grayscales (S210). A measured gamma included in the first measured gamma data may be calculated by Mathematical formula 1 described above.

The measured gamma calculator 155 may calculate second measured gamma data corresponding to the measured grayscale based on the measured luminance data LDM corresponding to the measured grayscale and luminance data corresponding to an adjacent grayscale that is adjacent to the measured grayscale (S220). A measured gamma included in the second measured gamma data may be calculated by Mathematical formula 2 described above.

The measured gamma calculator 155 may compare a difference between the first measured gamma data and the second measured gamma data with a threshold value (S230). When the difference between the first measured gamma data and the second measured gamma data is smaller than the threshold value, the first measured gamma data may be applied as the measured gamma data γDM (S242). When the difference between the first measured gamma data and the second measured gamma data is greater than or equal to the threshold value, the second measured gamma data may be applied as the measured gamma data γDM (S244).

The measured gamma calculator 155 may smooth the measured gamma data γDM (S250). According to one embodiment, the measured gamma calculator 155 may smooth the measured gamma data γDM by using a median filter.

Referring again to FIGS. 1, 2, 4, and 7, a measured luminance ratio calculator 157 of the data compensator 150 may calculate measured luminance ratio data LRDM based on the measured luminance data LDM (S126). The measured luminance ratio data LRDM may correspond to a ratio of the measured luminance data LDM to a measured target luminance. The measured luminance ratio data LRDM may include ratios of the measured luminances to the measured target luminance.

The compensation grayscale calculator 159 of the data compensator 150 may calculate the compensation grayscale data GDC for the measured grayscale based on input grayscale data GDI for the measured grayscale, the captured gamma data γDC, the captured luminance ratio data LRDC, the measured gamma data γDM, and the measured luminance ratio data LRDM (S128). According to one embodiment, the compensation grayscale data GDC for the measured grayscale may be calculated by Mathematical formulas 4 to 6 described above.

The data compensator 150 may calculate compensation grayscale data GDC for the predicted grayscale based on interpolation or extrapolation of the compensation grayscale data GDC for the captured grayscale (S130). According to one embodiment, the compensation grayscale data GDC for the predicted grayscale between the captured grayscales may be calculated by the interpolation of the compensation grayscale data GDC, and the compensation grayscale data GDC for the predicted grayscale that is greater than the maximum captured grayscale among the captured grayscales may be calculated by the extrapolation of the compensation grayscale data GDC.

A timing controller 140 may generate output grayscale data GDO based on the input grayscale data GDI and the compensation grayscale data GDC (S140). According to one embodiment, the timing controller 140 may generate the output grayscale data GDO by adding the compensation grayscale data GDC to the input grayscale data GDI.

The data driver 130 may generate a data voltage DV based on the output grayscale data GDO. The data driver 130 may provide the data voltage DV to the display panel 110.

Figure 9:
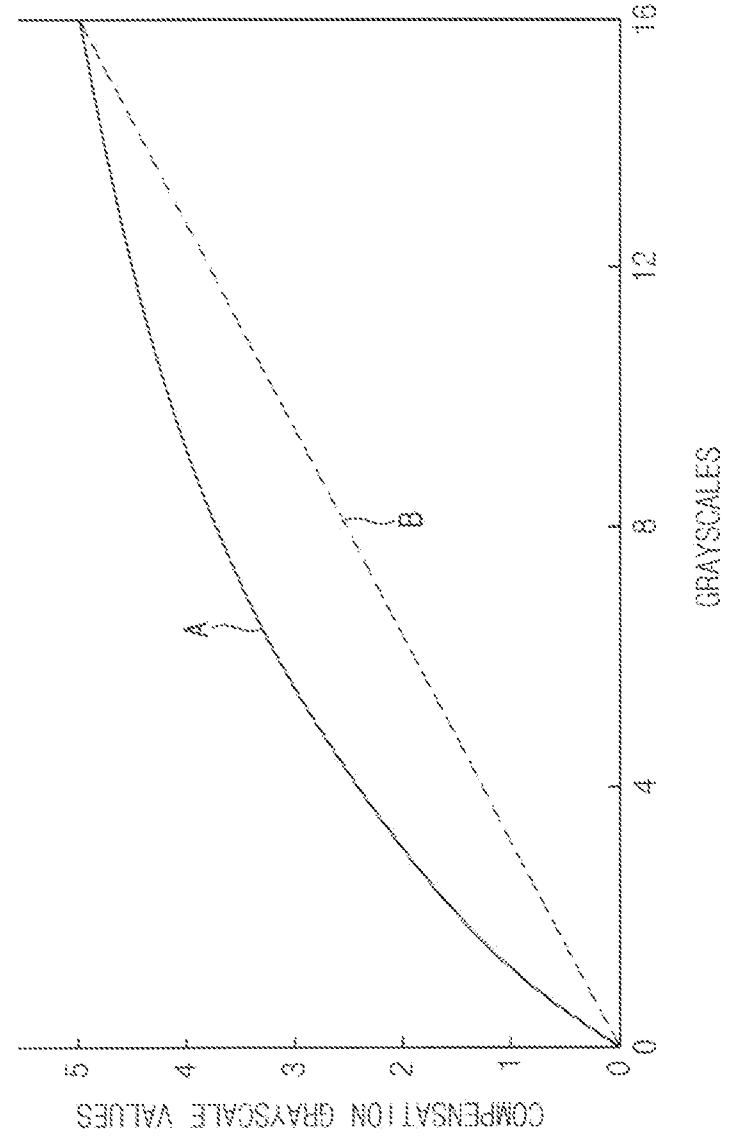
FIG. 9 is a graph showing compensation grayscale values according to measured grayscales.

FIG. 9 is a graph showing compensation grayscale values according to measured grayscales. A of FIG. 9 denotes compensation grayscale values for measured grayscales according to an embodiment, and B of FIG. 9 denotes compensation grayscale values for measured grayscales according to a comparative example.

Referring to FIG. 9, compensation grayscale values for measured grayscales according to an embodiment may be nonlinearly calculated based on captured luminance data corresponding to a captured grayscale and measured luminance data corresponding to a measured grayscale, so that input grayscale values may be compensation for in consideration of both the captured luminance data and the measured luminance data. On the contrary, compensation grayscale values for measured grayscales according to a comparative example may be linearly calculated based on only the captured luminance data corresponding to the captured grayscale, so that input grayscale values may be compensation for in consideration of only the captured luminance data. Accordingly, the compensation grayscale values for the measured grayscales according to the embodiment may more accurately compensate for the input grayscale values than the compensation grayscale values for the measured grayscales according to the comparative example.

Figure 10:
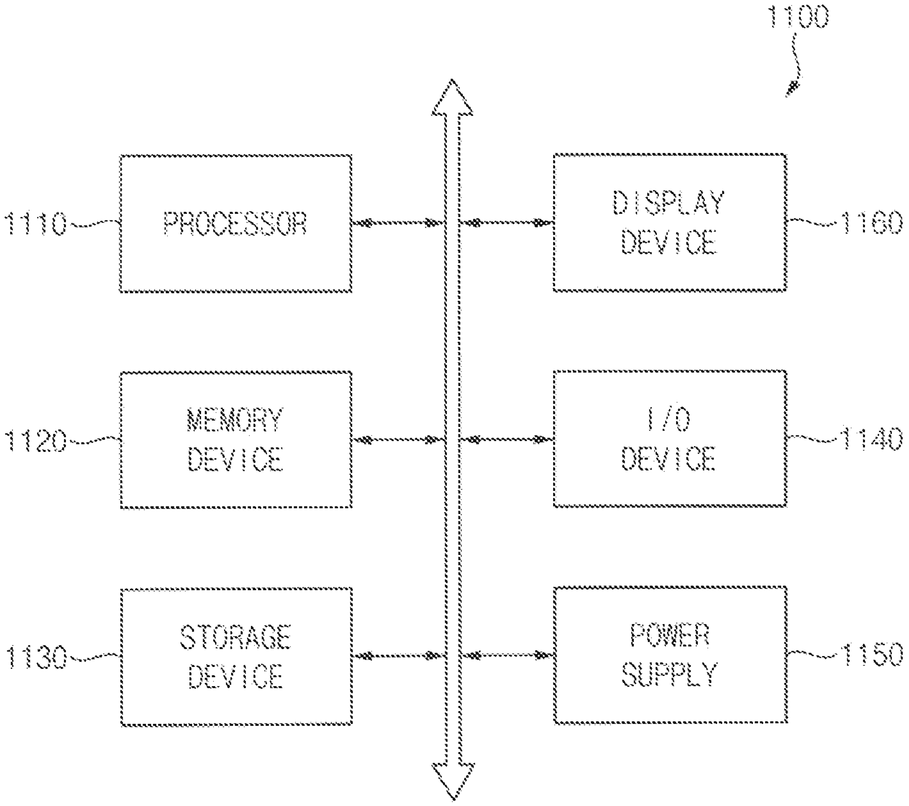
FIG. 10 is a block diagram showing an electronic device including a display device according to one embodiment of the present disclosure.

FIG. 10 is a block diagram showing an electronic device 1100 including a display device 1160 according to one embodiment of the present disclosure.

Referring to FIG. 10, an electronic device 1100 may include a processor 1110, a memory device 1120, a storage device 1130, an input/output (I/O) device 1140, a power supply 1150, and a display device 1160. The electronic device 1100 may further include various ports capable of communicating with a video card, a sound card, a memory card, a USB device, or the like, or communicating with other systems.

The processor 1110 may perform specific calculations or tasks. According to one embodiment, the processor 1110 may be a microprocessor, a central processing unit (CPU), or the like. The processor 1110 may be connected to other components through an address bus, a control bus, a data bus, or the like. According to one embodiment, the processor 1110 may also be connected to an expansion bus such as a peripheral component interconnect (PCI) bus.

The memory device 1120 may store data necessary for an operation of the electronic device 1100. For example, the memory device 1120 may include a non-volatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM), and/or a volatile memory device such as a dynamic random access memory (DRAM), a static random access memory (SRAM), and a mobile DRAM.

The storage device 1130 may include a solid state drive (SSD), a hard disk drive (HDD), a CD-ROM, and the like. The I/O device 1140 may include an input device such as a keyboard, a keypad, a touch pad, a touch screen, and a mouse, and an output device such as a speaker and a printer. The power supply 1150 may supply a power required for the operation of the electronic device 1100. The display device 1160 may be connected to other components through the buses or other communication links.

Since the display device 1160 calculates compensation grayscale data for a measured grayscale based on captured luminance data and measured luminance data, input grayscale data for the measured grayscale may be accurately compensated. In addition, since the display device 1160 generates output grayscale data by accurately compensating for the input grayscale data, an image having a uniform luminance may be displayed.

The display device, the image compensation method for the display device, and the image compensation system for the display device according to the embodiments may be applied to a display device included in a computer, a notebook, a mobile phone, a smartphone, a smart pad, a PMP, a PDA, an MP3 player, or the like.

Although the display devices, the image compensation methods for the display devices, and the image compensation systems for the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a display panel including a plurality of pixels;

a data compensator configured to calculate compensation grayscale data for a measured grayscale based on captured luminance data including luminances of the pixels corresponding to one of captured grayscales included in a plurality of grayscales, measured luminance data including luminances of a plurality of areas of the display panel corresponding to the measured grayscale other than the captured grayscales among the grayscales, and input grayscale data for the measured grayscale;

a timing controller configured to generate output grayscale data based on the input grayscale data and the compensation grayscale data; and a data driver configured to generate a data voltage based on the output grayscale data and provide the data voltage to the display panel.

2. The display device of claim 1, wherein the measured grayscale is smaller than a minimum captured grayscale.

3. The display device of claim 1, wherein the data compensator includes:

a captured gamma calculator configured to calculate captured gamma data based on the captured luminance data;

a captured luminance ratio calculator configured to calculate captured luminance ratio data corresponding to a ratio of the captured luminance data to a captured target luminance based on the captured luminance data;

a measured gamma calculator configured to calculate measured gamma data based on the measured luminance data;

a measured luminance ratio calculator configured to calculate measured luminance ratio data corresponding to a ratio of the measured luminance data to a measured target luminance based on the measured luminance data; and a compensation grayscale calculator configured to calculate the compensation grayscale data for the measured grayscale based on the input grayscale data for the measured grayscale, the captured gamma data, the captured luminance ratio data, the measured gamma data, and the measured luminance ratio data.

4. The display device of claim 3, wherein the captured target luminance includes an average luminance of pixels located at a center portion of the display panel among the pixels.

5. The display device of claim 3, wherein the measured gamma calculator is configured to calculate the measured gamma data based on the measured luminance data and luminance data corresponding to a maximum grayscale among the grayscales.

6. The display device of claim 3, wherein the measured gamma calculator is configured to calculate the measured gamma data based on the measured luminance data and luminance data corresponding to a grayscale that is adjacent to the measured grayscale among the grayscales.

7. The display device of claim 3, wherein the measured gamma calculator is configured to smooth the measured gamma data by using a median filter.

8. The display device of claim 3, wherein the measured target luminance includes a luminance of an area located at a center of the display panel among the areas.

9. The display device of claim 3, wherein the compensation grayscale calculator is configured to calculate the compensation grayscale data which include a compensation grayscale value for the measured grayscale by Mathematical formulas 1, 2 and 3 below:

$$LRM=\alpha*LRC \quad \text{Mathematical formula 1}$$

$$\gamma M=\beta*\gamma C \quad \text{Mathematical formula 2}$$

$$GC=GI/(LRC*\alpha)1/(\gamma C*\beta))-GI \quad \text{Mathematical formula 3}$$

where LRM is a measured luminance ratio included in measured luminance ratio data, LRC is a captured luminance ratio included in captured luminance ratio data, γM is a measured gamma included in measured gamma data, γC is a captured gamma included in captured gamma data, GC is a compensation grayscale value included in compensation grayscale data, and GI is an input grayscale value included in input grayscale data.

10. The display device of claim 1, wherein the data compensator is configured to calculate compensation grayscale data for the captured grayscale based on the captured luminance data and input grayscale data for the captured grayscale.

11. The display device of claim 10, wherein the data compensator is configured to calculate compensation grayscale data for a predicted grayscale other than the captured grayscales and the measured grayscale among the grayscales based on interpolation or extrapolation of the compensation grayscale data for the captured grayscale.

12. An image compensation method for a display device, the image compensation method comprising:

generating captured luminance data including luminances of a plurality of pixels of a display panel corresponding to one of captured grayscales included in a plurality of grayscales;

generating measured luminance data including luminances of a plurality of areas of the display panel corresponding to a measured grayscale other than the captured grayscales among the grayscales;

calculating compensation grayscale data for the measured grayscale based on the captured luminance data, the measured luminance data, and input grayscale data for the measured grayscale;

generating output grayscale data based on the input grayscale data and the compensation grayscale data; and providing a data voltage generated based on the output grayscale data to the display panel.

13. The image compensation method of claim 12, wherein the measured grayscale is smaller than a minimum captured grayscale.

14. The image compensation method of claim 12, wherein the calculating of the compensation grayscale data for the measured grayscale includes:

calculating captured gamma data based on the captured luminance data;

calculating captured luminance ratio data corresponding to a ratio of the captured luminance data to a captured target luminance based on the captured luminance data;

calculating measured gamma data based on the measured luminance data;

calculating measured luminance ratio data corresponding to a ratio of the measured luminance data to a measured target luminance based on the measured luminance data; and calculating the compensation grayscale data for the measured grayscale based on the input grayscale data for the measured grayscale, the captured gamma data, the captured luminance ratio data, the measured gamma data, and the measured luminance ratio data.

15. The image compensation method of claim 14, wherein the calculating of the measured gamma data includes calculating the measured gamma data based on the measured luminance data and luminance data corresponding to a maximum grayscale among the grayscales.

16. The image compensation method of claim 14, wherein the calculating of the measured gamma data includes calculating the measured gamma data based on the measured luminance data and luminance data corresponding to a grayscale that is adjacent to the measured grayscale among the grayscales.

17. The image compensation method of claim 14, wherein the calculating of the measured gamma data includes smoothing the measured gamma data by using a median filter.

* * * * *